(12) United States Patent
Taunton et al.

(10) Patent No.: US 7,903,810 B2
(45) Date of Patent: *Mar. 8, 2011

(54) SINGLE INSTRUCTION FOR DATA SCRAMBLING

(75) Inventors: Mark Taunton, Cambridge (GB);
Timothy Martin Dobson, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 1254 days.

This patent is subject to a terminal disclaimer.

(21) Appl. No.: 10/946,173

(22) Filed: Sep. 22, 2004

(65) Prior Publication Data

US 2005/0069134 A1 Mar. 31, 2005

Related U.S. Application Data

(60) Provisional application No. 60/505,846, filed on Sep. 26, 2003.

(51) Int. Cl.
*H04K 1/00* (2006.01)
(52) U.S. Cl. ............... 380/28; 380/37; 380/42; 380/210; 380/255; 380/257; 713/190; 725/31; 712/22
(58) Field of Classification Search .................. 713/1, 2, 713/188, 194, 190; 380/200, 201, 255, 277, 380/37, 42, 210, 28, 257; 726/2; 725/31; 712/22
See application file for complete search history.

(56) References Cited

U.S. PATENT DOCUMENTS

| | | | |
|---|---|---|---|
| 5,369,773 A | 11/1994 | Hammerstrom | |
| 5,612,974 A | 3/1997 | Astrachan | |
| 5,719,890 A | 2/1998 | Thomman et al. | |
| 5,809,493 A | 9/1998 | Ahamed et al. | |
| 5,909,427 A | 6/1999 | Manning et al. | |
| 5,931,954 A | 8/1999 | Alamouti | |
| 5,931,965 A | 8/1999 | Alamouti | |
| 5,954,836 A | 9/1999 | Wang | |
| 6,061,449 A * | 5/2000 | Candelore et al. | 380/28 |
| 6,081,921 A | 6/2000 | Simanapalli | |
| 6,182,265 B1 | 1/2001 | Lim et al. | |
| 6,208,655 B1 | 3/2001 | Hodgins et al. | |
| 6,314,102 B1 | 11/2001 | Czerwiec et al. | |
| 6,442,729 B1 | 8/2002 | Kim et al. | |
| 6,448,910 B1 | 9/2002 | Lu | |
| 6,570,927 B1 | 5/2003 | Van Stralen et al. | |
| 6,577,678 B2 | 6/2003 | Scheuermann | |
| 6,594,262 B1 | 7/2003 | Kwon et al. | |
| 6,631,488 B1 | 10/2003 | Stambaugh et al. | |
| 6,697,994 B2 | 2/2004 | Ishikawa | |

(Continued)

OTHER PUBLICATIONS

Splitterless asymmetric digital subscriber line transceivers 2 (splitterless ADSL2), International Telecommunications Union (ITU-T Recommendation G.992.4), 24 pages, Jul. 2002.

(Continued)

*Primary Examiner* — Joseph Thomas
*Assistant Examiner* — Joseph Pan
(74) *Attorney, Agent, or Firm* — Sterne, Kessler, Goldstein & Fox PLLC

(57) ABSTRACT

A method and apparatus are disclosed for efficiently scrambling one or more bytes of data according to DSL standards on a processor. This is achieved by providing an instruction for scrambling one or more bytes of data according to the DSL standards. Accordingly, the invention advantageously provides a processor with the ability to scramble data with a single instruction thus allowing for more efficient and faster scrambling operations for subsequent modulation and transmission.

41 Claims, 10 Drawing Sheets

U.S. PATENT DOCUMENTS

| | | | |
|---|---|---|---|
| 6,754,283 | B1 | 6/2004 | Li |
| 6,915,427 | B2 | 7/2005 | Jones, IV et al. |
| 6,915,472 | B1 | 7/2005 | Jones, IV et al. |
| 7,039,852 | B2* | 5/2006 | Dent .............................. 714/781 |
| 7,055,088 | B2 | 5/2006 | Betts |
| 7,139,305 | B2 | 11/2006 | Gavnoudias et al. |
| 7,154,895 | B1 | 12/2006 | Bornemisza et al. |
| 7,199,740 | B1* | 4/2007 | Ferguson et al. .............. 341/144 |
| 7,305,567 | B1* | 12/2007 | Hussain et al. ................ 713/189 |
| 7,305,608 | B2 | 12/2007 | Taunton et al. |
| 7,580,412 | B2 | 8/2009 | Taunton et al. |
| 2001/0008001 | A1* | 7/2001 | Suemura ....................... 710/129 |
| 2002/0124154 | A1 | 9/2002 | Stacey et al. |
| 2002/0138721 | A1* | 9/2002 | Kwon et al. ................... 713/151 |
| 2003/0016670 | A1 | 1/2003 | Seidl et al. |
| 2003/0091109 | A1* | 5/2003 | Okunev et al. ................. 375/222 |
| 2003/0190910 | A1 | 10/2003 | Scheuermann |
| 2003/0225949 | A1 | 12/2003 | Hoang et al. |
| 2004/0025104 | A1 | 2/2004 | Amer |
| 2004/0228479 | A1* | 11/2004 | Crispin et al. ................... 380/28 |
| 2005/0068957 | A1 | 3/2005 | Taunton et al. |
| 2005/0068958 | A1 | 3/2005 | Taunton et al. |
| 2005/0068959 | A1 | 3/2005 | Taunton et al. |
| 2005/0084104 | A1 | 4/2005 | Taunton et al. |
| 2005/0094551 | A1 | 5/2005 | Taunton et al. |
| 2005/0100111 | A1 | 5/2005 | Taunton et al. |
| 2005/0240936 | A1 | 10/2005 | Jones et al. |
| 2006/0050739 | A1 | 3/2006 | Narad et al. |
| 2008/0137771 | A1 | 6/2008 | Taunton et al. |

OTHER PUBLICATIONS

Asymmetric digital subscriber line (ADSL) transceivers, International Telecommunications Union (ITU-T Recommendation G.992.1), 256 pages, Jun. 1999.

Splitterless asymmetric digital subscriber line (ADSL) transceivers, International Telecommunication Union (ITU-T Recommendation G.992.2), 179 pages, Jun. 1999.

Asymmetric digital subscriber line transceivers 2 (ADSL2), International Telecommunication Union (ITU-T Recommendation G.992.3), 436 pages, Jan. 2005.

International Telecommunications Union, "Integrated Services Digital Network (ISDN) ISDN User Network Interfaces", ITU-T Recommendation I.432, Mar. 1993, all pages.

Wilson, "FirePath" Tuesday, Aug. 20, 2002.

Clarke, "Broadcom's Firepath combines RISC, DSP elements", EE Times (Jun. 13, 2001 3:27 PM EDT).

Jae Sung Lee, "Design of new DSP instructions and their hardware architecture for high-speed FFT", 2001 IEEE Workshop on Signal Processing Systems, IEEE Workshop on Sep. 26-28, 2001 pp. 80-90.

Seong-Jo Na, "Design and implementation for 125 mW/MIPS ultra-high speed low power asymmetric digital subscriber line transceiver chip", The First IEEE Asia Pacific Conference on ASICs, 1999, AP-ASIC '99, Aug. 23-25, 1999 pp. 21-24.

Non-Final Rejection mailed Feb. 5, 2008 for U.S. Appl. No. 10/946,304, 20 pgs.

Final Rejection mailed Oct. 20, 2008 for U.S. Appl. No. 10/946,304, 22 pgs.

Notice of Allowance mailed Apr. 15, 2009 for U.S. Appl. No. 10/946,304, 4 pgs.

Non-Final Rejection mailed May 12, 2008 for U.S. Appl. No. 10/946,305, 13 pgs.

Final Rejection mailed Oct. 29, 2008 for U.S. Appl. No. 10/946,305, 12 pgs.

Non-Final Rejection mailed May 12, 2008 for U.S. Appl. No. 10/946,303, 13 pgs.

Final Rejection mailed Nov. 14, 2008 for U.S. Appl. No. 10/946,303, 12 pgs.

Non-Final Rejection mailed Dec. 27, 2006 for U.S. Appl. No. 10/949,517, 13 pgs.

Notice of Allowance mailed Jul. 26, 2007 for U.S. Appl. No. 10/949,517, 4 pgs.

Non-Final Rejection mailed Sep. 29, 2008 for U.S. Appl. No. 10/949,466, 21 pgs.

Second Non-Final Rejection mailed Apr. 22, 2009 for U.S. Appl. No. 10/949,466, 25 pgs.

Final Rejection mailed Sep. 11, 2009 for U.S. Appl. No. 10/949,466, 30 pgs.

Non-Final Rejection mailed Mar. 27, 2008 for U.S. Appl. No. 10/946,306, 12 pgs.

Final Rejection mailed Mar. 27, 2008 for U.S. Appl. No. 10/946,306, 13 pgs.

Wen-Yu Tseng et al., "Design and Implementation of a High Speed Parallel Architecture for ATM UNI," ispan, pp. 288-294, 1996 International Symposium on Parallel Architectures, Algorithms and Networks (ISPAN '96), 1996.

Seo et al., "Bit-level packet-switching all-optical multihop shuffle networks with deflection routing", Applied Optics, vol. 36, No. 14, May 10, 1997, pp. 3142-3146.

Notice of Allowance mailed Jan. 25, 2010 for U.S. Appl. No. 10/946,303, 10 pgs.

* cited by examiner

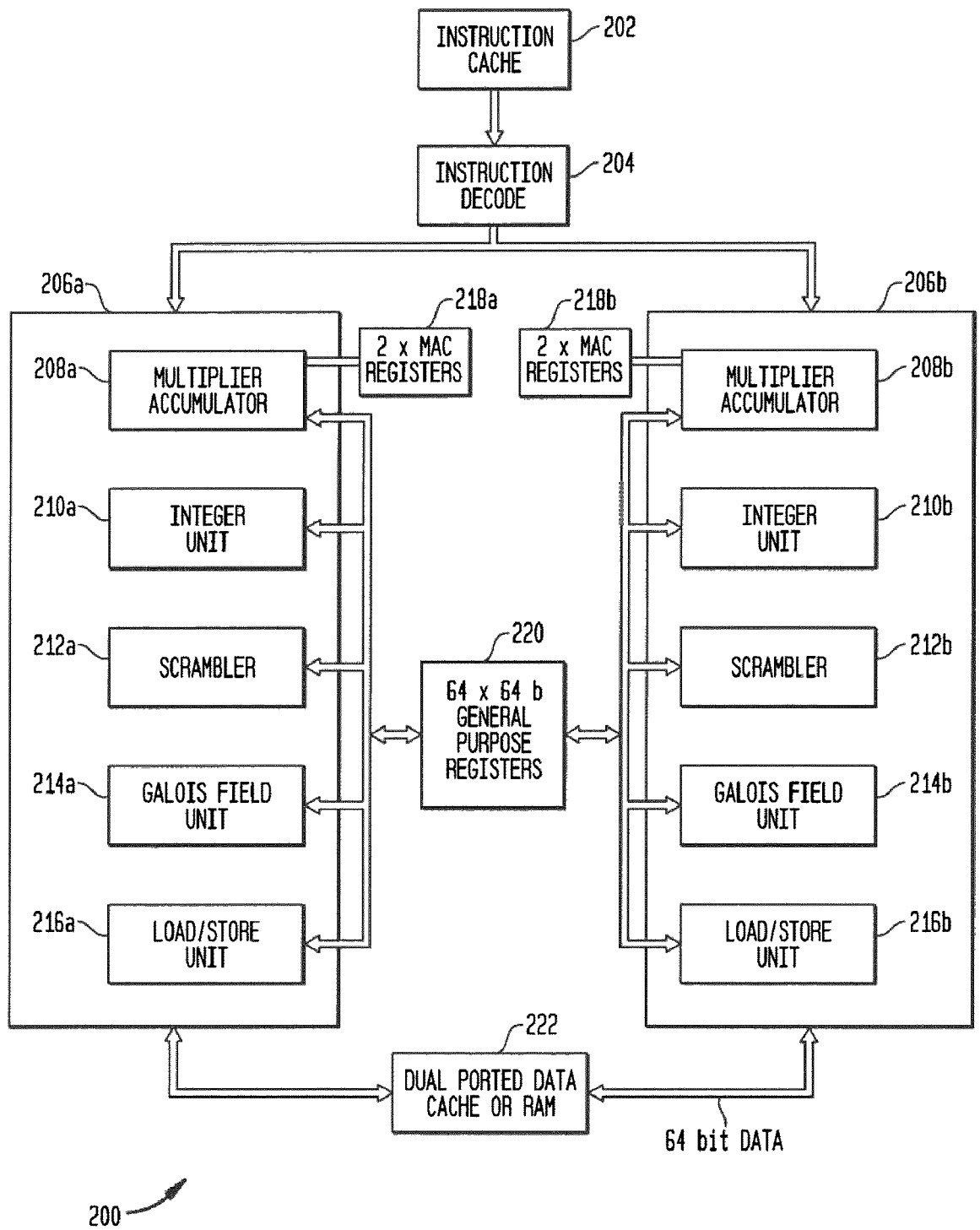

*FIG. 3A*

| OPCODE | DESTINATION | SOURCE 1 | SOURCE 2 |

*FIG. 3B*

| DSLSCR | OUT | STATE | IN |

SINGLE INSTRUCTION FOR DATA SCRAMBLING

CROSS-REFERENCE TO RELATED APPLICATIONS

This application claims priority from U.S. provisional application No. 60/505,846 filed on Sep. 26, 2003 and titled "System and Method for Scrambling Digital Subscriber Line Data", which is incorporated by reference herein in its entirety.

BACKGROUND OF THE INVENTION

1. Field of the Invention

The present invention relates generally to Digital Subscriber Line (DSL) systems and to the design of instructions for processors. More specifically, the present invention relates to a system, method and processor instruction for scrambling data in a DSL modem.

2. Related Art

In modems for Digital Subscriber Line (DSL) systems based on Discrete Multi-Tone (DMT) modulation, it is common to apply a data scrambling technique as part of the transmission process. For example, international and national standards for both Asymmetric Digital Subscriber Line (ADSL) and DMT-based Very High Bit-Rate DSL (VDSL) require scramblers. The stream of data bits created within the transmitter part of a DSL modem is defined by these standards to be scrambled using a specified scrambling process.

The intent of the scrambling process is to deliberately create a seemingly random pattern of bits in the scrambled output stream, even if a regular pattern of values (for example, all 0 bits, all 1 bits, or regularly alternating 0s and 1s, etc. . . . ) is received in the original input to the scrambler. This is important to avoid potential problems the presence of such patterns can cause in the subsequent generation and handling of analog signals modulated by the bit stream.

The scrambling process is, by necessity, well-defined and reversible. In a receiving modem, after the seemingly random bit sequence has been demodulated from the received analog signal, it is passed through a complementary de-scrambler which performs the inverse process and recovers the original bit stream which was fed to the scrambler in the transmitter.

In existing standards for both ADSL and VDSL, a single specification is used for the scrambling process. The effect of this scrambler specification is to create an output stream of bits y(n) (n=0, 1, 2, . . . ) from an input stream of bits x(n), in the following manner:

$$y(n)=x(n)+y(n-18)+y(n-23)$$

where + means addition modulo 2 (which is the equivalent to logical "exclusive-or"). Thus, the sequence of scrambled output bits depends on both the values of the unscrambled input bits x(n) and the values of previously generated (scrambled) output bits y(n).

In prior art hardware oriented DSL modems, the scrambling of data is typically performed by fixed-function logic circuits. However, such system designs are typically much less adaptable to varying application requirements. In such hardware implementations of the scrambling function, the data flow is fixed in an arrangement dictated by the physical movement of data through the hardware, and cannot be adapted or modified to suit different modes of use. For example, in such systems, the 'state' (the history of earlier output bits) is held internally within the scrambling hardware, rather than being passed in as and when scrambling is required. This means that re-using a hardware implementation to scramble multiple distinct data streams at the same time is either impossible, or certainly more complex to implement, since some arrangement must be made to allow the individual states for the different streams to be swapped in and out.

Current prior art DSL modems often use software to perform at least some of the various functions in a modem. One disadvantage of scramblers in current DSL modems is the inefficiency of such scramblers as the line-density and data-rates required of modems increase. As line-density and data-rates increase, so does the pressure on prior art scramblers to perform efficiently the individual processing tasks, such as scrambling, which make up the overall modem function.

Another disadvantage with current prior art scramblers is the software complexity required to implement such scramblers. Using conventional bit-wise instructions such as bit-wise shift, bit-wise exclusive-or, etc. . . . may take many tens or even hundreds of cycles to perform the scrambling operation for a typical data block of 100 bytes.

Thus, the scrambling process can represent a significant proportion of the total computational cost for current prior art DSL modems, especially in the case of a multi-line system where one processor handles the operations for multiple lines. With increasing workloads, it becomes necessary to improve the efficiency of the scrambling of data over that of such prior art modems.

Further limitations and disadvantages of conventional and traditional approaches will become apparent to one of skill in the art, through comparison of such systems with the present invention as set forth in the remainder of the present application with reference to the drawings.

SUMMARY OF THE INVENTION

According to the present invention, these objects are achieved by a system and method as defined in the claims. The dependent claims define advantageous and preferred embodiments of the present invention.

The present invention provides a method and apparatus for efficiently scrambling one or more bytes of data according to DSL standards in a modem processor. This is achieved by providing an instruction for scrambling one or more bytes of data according to the DSL standards in a modem processor.

The system and method of the present invention advantageously provide a processor with the ability to scramble data with a single instruction thus allowing for more efficient and faster scrambling operations for subsequent modulation and transmission. For example, in one embodiment, the present invention advantageously completes the whole scrambling operation for eight bytes in a single cycle. The present invention also advantageously provides great flexibility in determining the arrangement and flow of data during the scrambling process through the use of registers and memory for storing the original data to be scrambled, the resulting scrambled data, and the state data.

As said above, the invention comprises a method for scrambling data. A 64-bit sequence of the data is received. A 23 most significant bits of a previously scrambled 64-bit sequence of data is received. The 64-bit sequence of the data is scrambled using the 23 most significant bits of the previously scrambled 64-bit sequence of data.

In an embodiment, a first group of data of the 64-bit sequence of the data is scrambled by a first process, a second group of data of the 64-bit sequence of the data is scrambled by a second process, a third group of data of the 64-bit sequence of the data is scrambled by a third process, a fourth group of data of the 64-bit sequence of the data is scrambled by a fourth process, and a fifth group of data of the 64-bit sequence of the data is scrambled by a fifth process.

In the first process, the first group of data comprises a forty-seventh most significant bit through a sixty-fourth most significant bit of the 64-bit sequence of the data. A sixth group of data of the 23 most significant bits of the previously scrambled 64-bit sequence of data comprises a first most significant bit through an eighteenth most significant bit of the 23 most significant bits of the previously scrambled 64-bit sequence of data. A seventh group of data of the 23 most significant bits of the previously scrambled 64-bit sequence of data comprises a sixth most significant bit through a twenty-third most significant bit of the 23 most significant bits of the previously scrambled 64-bit sequence of data. From the first group of data, the sixth group of data, and the seventh group of data, the first process produces an eighth group of data comprising a forty-seventh most significant bit through a sixty-fourth most significant bit of the scrambled 64-bit sequence of the data.

In the second process, the second group of data comprises a forty-second most significant bit through a forty-sixth most significant bit of the 64-bit sequence of the data. A sixth group of data of the scrambled 64-bit sequence of the data comprises a sixtieth most significant bit through a sixty-fourth most significant bit of the scrambled 64-bit sequence of the data. A seventh group of data of the 23 most significant bits of the previously scrambled 64-bit sequence of data comprises a first most significant bit through a fifth most significant bit of the 23 most significant bits of the previously scrambled 64-bit sequence of data. From the second group of data, the sixth group of data, and the seventh group of data, the second process produces an eighth group of data comprising a forty-second most significant bit through a forty-sixth most significant bit of the scrambled 64-bit sequence of the data.

In the third process, the third group of data comprises a twenty-fourth most significant bit through a forty-first most significant bit of the 64-bit sequence of the data. A sixth group of data of the scrambled 64-bit sequence of the data comprises a forty-second most significant bit through a fifty-ninth most significant bit of the scrambled 64-bit sequence of the data. A seventh group of data of the scrambled 64-bit sequence of the data comprises a forty-seventh most significant bit through a sixty-fourth most significant bit of the scrambled 64-bit sequence of the data. From the third group of data, the sixth group of data, and the seventh group of data, the third process produces an eighth group of data comprising a twenty-fourth most significant bit through a forty-first most significant bit of the scrambled 64-bit sequence of the data.

In the fourth process, the fourth group of data comprises a sixth most significant bit through a twenty-third most significant bit of the 64-bit sequence of the data. A sixth group of data of the scrambled 64-bit sequence of the data comprises a twenty-fourth most significant bit through a forty-first most significant bit of the scrambled 64-bit sequence of the data. A seventh group of data of the scrambled 64-bit sequence of the data comprises a twenty-ninth most significant bit through a forty-sixth most significant bit of the scrambled 64-bit sequence of the data. From the fourth group of data, the sixth group of data, and the seventh group of data, the fourth process produces an eighth group of data comprising a sixth most significant bit through a twenty-third most significant bit of the scrambled 64-bit sequence of the data.

In the fifth process, the fifth group of data comprises a first most significant bit through a fifth most significant bit of the 64-bit sequence of the data. A sixth group of data of the scrambled 64-bit sequence of the data comprises a nineteenth most significant bit through a twenty-third most significant bit of the scrambled 64-bit sequence of the data. A seventh group of data of the scrambled 64-bit sequence of the data comprises a twenty-fourth most significant bit through a twenty-eighth most significant bit of the scrambled 64-bit sequence of the data. From the fifth group of data, the sixth group of data, and the seventh group of data, the fifth process produces an eighth group of data comprising a first most significant bit through a fifth most significant bit of the scrambled 64-bit sequence of the data.

For a process as identified above, for each bit of the eighth group, a first corresponding bit of the group corresponding to the process is identified, a second corresponding bit of the sixth group is identified, and a third corresponding bit of the seventh group is identified. For each bit of the eighth group, a classification for the identified first corresponding bit, the identified second corresponding bit, and the identified third corresponding bit is determined according to whether a number of bits from the identified first corresponding bit, the identified second corresponding bit, and the identified third corresponding bit having a first value of one is one of an odd number and an even number. For each bit of the eighth group, a second value for the bit of the eighth group is set according to the determined classification.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 2 illustrates a block diagram of a processor in accordance with one embodiment of the present invention.

FIG. 3A illustrates an instruction format for a three-operand instruction supported by the processor in accordance with one embodiment of the present invention.

FIG. 3B illustrates an instruction format for scrambling one or more bytes in accordance with one embodiment of the present invention.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known processes and steps have not been described in detail in order not to unnecessarily obscure the present invention.

The invention generally pertains to a new instruction for operating a processor which significantly reduces the number of cycles needed to perform the scrambling of data in accordance with DSL standards (e.g. ADSL or VDSL). In one embodiment, the present invention directly implements the scrambling process for 8 bytes (64 bits) of data in a single operation. The instruction takes as input 64 bits of new (original) source data, and 23 bits of previous scrambling state, and produces as output 64 bits of scrambled data. Because the scrambling process is recursive, the last 23 bits of the output value from one application of the instruction for a data stream act as the "previous scrambling state" input to the next application of the instruction to the same stream.

A first set of embodiments of the invention are now discussed with references to FIGS. 1 to 4. However, those skilled in the art will readily appreciate that the detailed description given herein with respect to these figures is for explanatory purposes as the invention extends beyond these limited embodiments.

Figure 1:
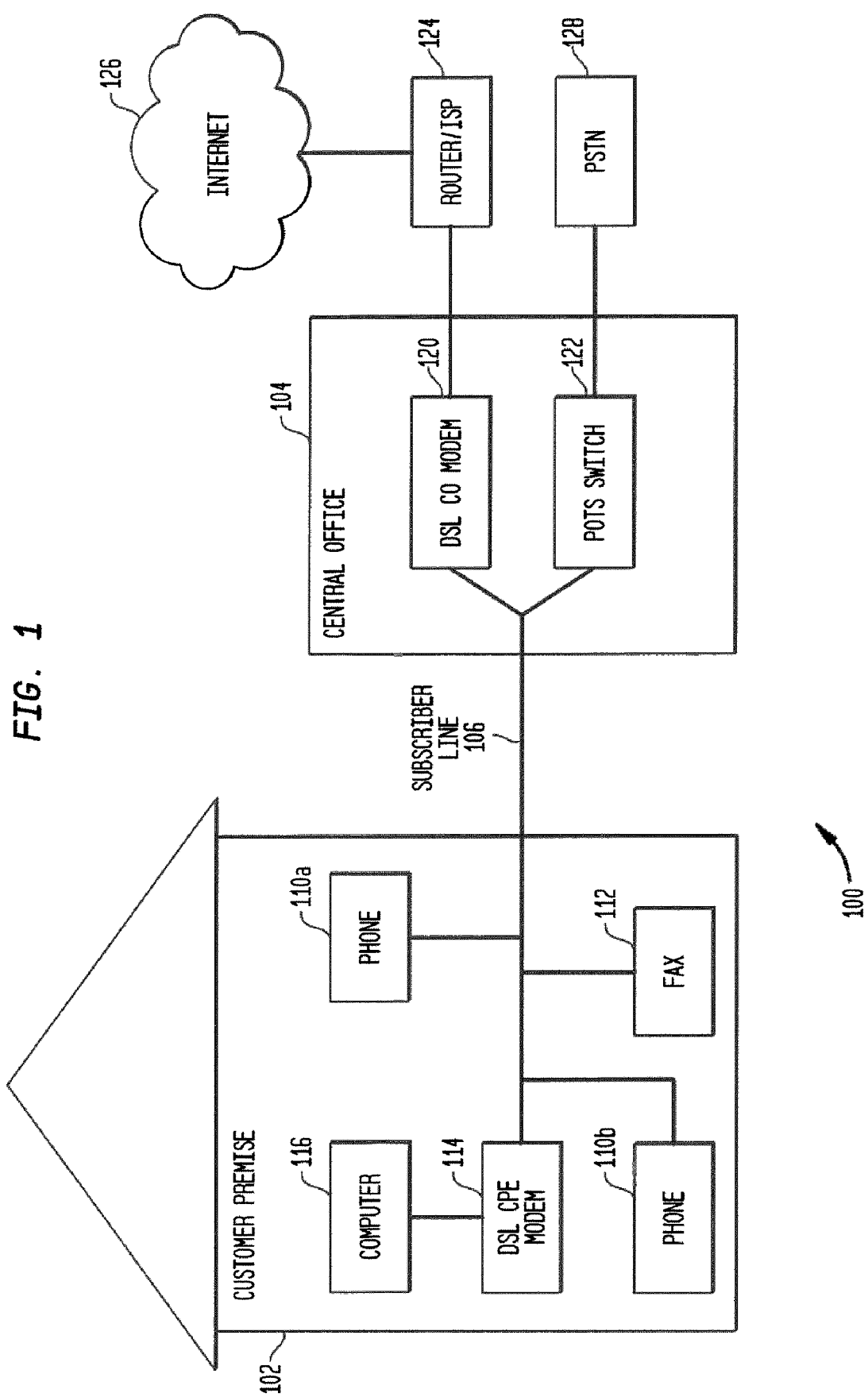
FIG. 1 illustrates a block diagram of a communications system in accordance with the present invention.

Referring now to FIG. 1, there is shown a block diagram of a communications system 100 in accordance with one embodiment of the present invention. System 100 provides traditional voice telephone service (plain old telephone service—POTS) along with high speed Internet access between a customer premise 102 and a central office 104 via a subscriber line 106. At the customer premise end 102, various customer premise devices may be coupled to the subscriber line 106, such as telephones 110a, 110b, a fax machine 112, a DSL CPE (Customer Premise Equipment) modem 114 and the like. A personal computer 116 may be connected via DSL CPE modem 114. At the central office end 104, various central office equipment may be coupled to the subscriber line 106, such as a DSL CO (Central Office) modem 120 and a POTS switch 122. Modem 120 may be further coupled to a router or ISP 124 which allows access to the Internet 126. POTS switch 122 may be further coupled to a PSTN 128.

In accordance with one embodiment of the present invention, system 100 uses a Discrete Multi-Tone (DMT) modulation technique to send data between the central office 104 and the customer premise 102 via subscriber line 106. The DSL CO modem 120 at the central office 104 scrambles the data to be transmitted in accordance with the principles of the present invention before transmitting the data via subscriber line 106. Similarly, when data is sent from the customer premise 102 to the central office 104, the DSL CPE modem 114 at the customer premise 102 scrambles the data to be transmitted in accordance with the principles of the present invention before transmitting the data via subscriber line 106. In a preferred embodiment, DSL CO modem 120 incorporates a BCM6411 or BCM6510 device, produced by Broadcom Corporation of Irvine, Calif., to implement its various functions.

Referring now to FIG. 2, there is shown a schematic block diagram of the core of a modem processor 200 in accordance with one embodiment of the present invention. In a preferred embodiment, processor 200 is the FirePath processor used in the BCM6411 and BCM6510 devices. The processor 200 is a 64 bit long instruction word (LIW) machine consisting of two identical execution units 206a, 206b. Each unit 206a, 206b is capable of 64 bit execution on multiple data units, (for example, four 16 bit data units at once), each controlled by half of the 64 bit instruction. The twin execution units, 206a, 206b, may include single instruction, multiple data (SIMD) units.

Processor 200 also includes an instruction cache 202 to hold instructions for rapid access, and an instruction decoder 204 for decoding the instruction received from the instruction cache 202. Processor 200 further includes a set of MAC Registers 218a, 218b, that are used to improve the efficiency of multiply-and-accumulate (MAC) operations common in digital signal processing, sixty four (or more) general purpose registers 220 which are preferably 64 bits wide and shared by execution units 206a, 206b, and a dual ported data cache or RAM 222 that holds data needed in the processing performed by the processor. Execution units 206a, 206b further comprise multiplier accumulator unit 208a, 208b, integer unit 210a, 210b, scrambler unit 212a, 212b, Galois Field unit 214a, 214b, and load/store unit 216a, 216b.

Multiplier accumulator units 208a, 208b perform the process of multiplication and addition of products (MAC) commonly used in many digital signal processing algorithms such as may be used in a DSL modem.

Integer units 210a, 210b, perform many common operations on integer values used in general computation and signal processing.

Galois Field units 214a, 214b perform special operations using Galois field arithmetic, such as may be executed in the implementation of the well-known Reed-Solomon error protection coding scheme.

Load/store units 216a, 216b perform accesses to the data cache or RAM, either to load data values from it into general purpose registers 220 or store values to it from general purpose registers 220. They also provide access to data for transfer to and from peripheral interfaces outside the core of processor 200.

Scrambler units 212a, 212b directly implement the scrambling process for the processor 200. These units may be instantiated separately within the processor 200 or may be integrated within another unit such as the integer unit 210. In one embodiment, each scrambler unit 212a, 212b takes as input 64 bits of new (original) source data, and 23 bits of previous scrambling state, and produces as output 64 bits of scrambled data. Because of the recursive definition of the scrambling process, the last 23 bits of the output value from one application of this instruction for some data stream act as the "previous scrambling state" input to the next application of the scrambling function to the same data stream.

Figure 4:
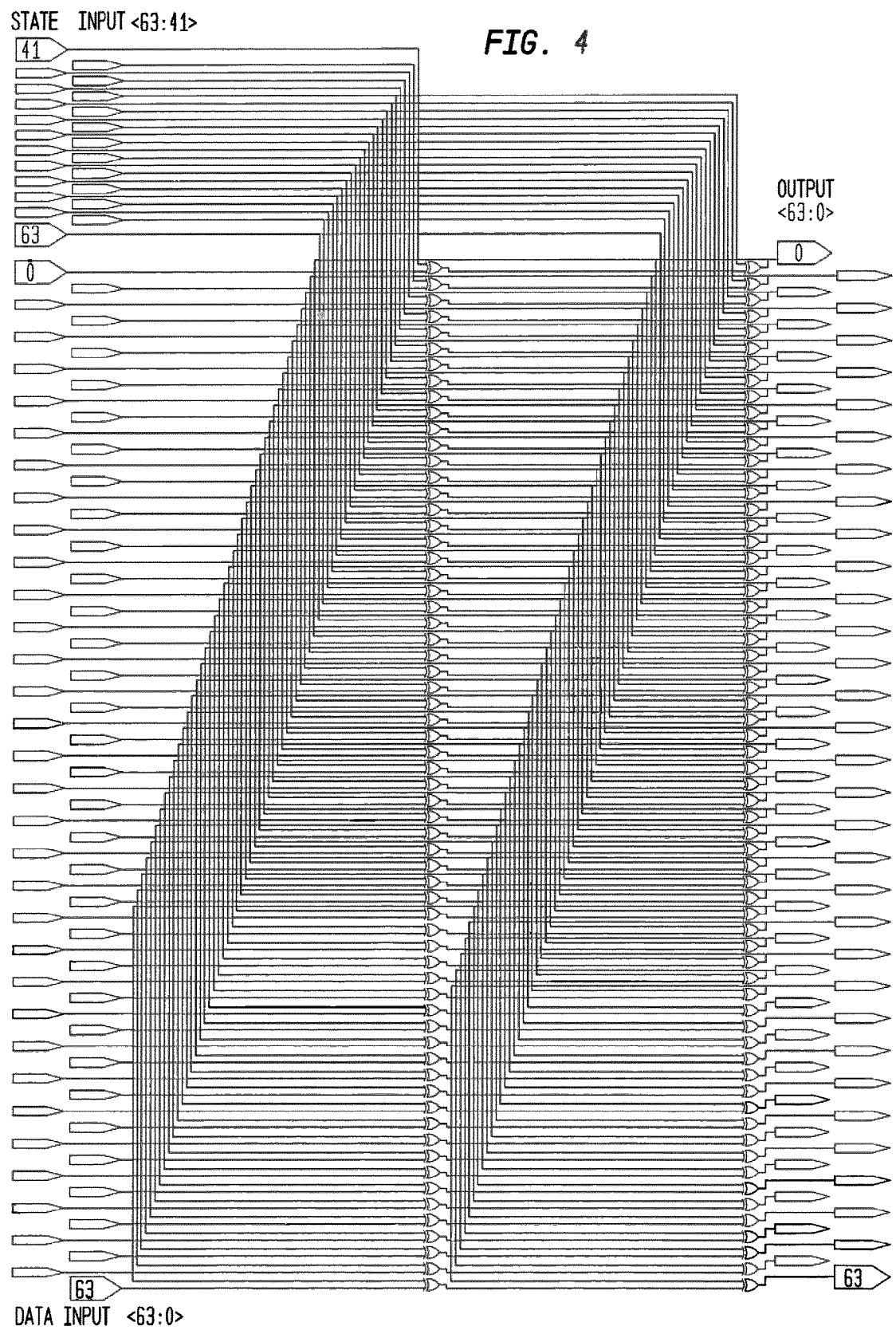
FIG. 4 is a logic diagram of one embodiment of the scrambling instruction.

Referring now to FIG. 3A, there is shown an example of an instruction format for a three-operand instruction supported by the processor 200. In one embodiment, the instruction format includes 14 bits of opcode and control information, and three six-bit operand specifiers. As will be appreciated by one skilled in the art, exact details such as the size of the instruction in bits, and how the various parts of the instruction are laid out and ordered within the instruction format, are not themselves critical to the principles of the present invention: the parts could be in any order as might be convenient for the implementation of the instruction decoder 204 of the processor 200 (including the possibility that any part of the instruction such as the opcode and control information may not be in a single continuous sequence of bits such as is shown in FIG. 4). The operand specifiers are references to registers in the set of general purpose registers 220 of processor 200. The first of the operands is a reference to a destination register for storing the results of the instruction. The second operand is a reference to a first source register for the instruction, and the third operand is a reference to a second source register for the instruction.

Referring now to FIG. 3B, there is shown an example of an instruction format for scrambling one or more bytes of data (DSLSCR) supported by processor 200 in accordance to the present invention. The DSLSCR instruction uses the three-operand instruction format shown in FIG. 3A, and in one embodiment, is defined to take three six-bit operand specifiers. (Again it should be observed that exact details of how this instruction format is implemented—the size, order and layout of the various parts of the instruction, exact binary codes used to represent the DSLSCR opcode, etc.—are not critical to the principles of the present invention.) The first of the operands is a reference to a destination register for an output "out" where the results of the DSLSCR instruction are stored. The second operand is a reference to a source register for a state input "state" from which state data is read, and the third operand is a reference to a source register for the data input "in" from which the original source data is read. One skilled in the art will realize that the present invention is not limited to any specific register or location for those registers but that the instruction of the present invention may refer to an arbitrary register in the general purpose registers 220.

Thus, by means of this generality of specification, the present invention advantageously achieves great flexibility in the use of the invention. For example, the present invention enables the original data, which is to be scrambled, to be obtained from any location chosen by the implementor (e.g. by first loading that data from the memory 222 into any convenient register). Likewise, the resulting scrambled data may be placed anywhere convenient for further processing such as in some general purpose register 220 for immediate further operations, or the resulting scrambled data may be placed back in memory 222 for later use. Similarly, the arrangement of how the 'state' data is obtained is also completely unconstrained, but may be arranged according to preference as to how the unscrambled and scrambled data streams are handled. Thus, the flexibility of the present invention is in sharp contrast to conventional (hardware) implementations of the scrambling function, where the data flow is fixed in an arrangement dictated by the physical movement of data through the hardware, and cannot be adapted or modified to suit different modes of use. For example, typically in such hardware contexts the 'state' (the history of earlier output bits) is held internally within the scrambling hardware, rather than being passed in as and when scrambling is required. This means that re-using a hardware implementation to scramble multiple distinct data streams at the same time is either impossible, or certainly more complex to implement, since some arrangement must be made to allow the individual states for the different streams to be swapped in and out.

In one embodiment, the scrambling instruction is used in the software on a processor chip-set implementing a central-office modem end of a DSL link (e.g. ADSL or VDSL). However, one skilled in the art will realize that the present invention is not limited to this implementation, but may be equally used in other contexts where data must be scrambled in the same way, such as in a DSL CPE modem at the customer premise, or in systems not implementing DSL.

In one embodiment, the DSLSCR instruction takes as one input an 8-byte sequence of data bytes as a composite 64-bit value. Its second input is a 23-bit value holding the state of the scrambling process between consecutive sections of data being scrambled, along with 41 bits which are ignored. In a preferred embodiment, this 23-bit state is equal to the last 23 bits of the previous output of the scrambling process (i.e. the result of a previous execution of the instruction to process the previous 8 bytes of data in the same data stream). In operation of the instruction, the input data bytes are scrambled using the defined scrambling method acting upon each consecutive bit in the data input operand. This combines the 64 bits of data with the 23 bits of previous state, to yield 64 bits of result; the 64 result bits are then written to the output operand. The last 23 of the result bits are also usable as the state input for the next scrambling operation to be applied to the same data stream (i.e. scrambling of the following 64 bits of data).

More specific details of one embodiment of the operation performed by the DSLSCR instruction is described below in which 'tmp' is an internal 64-bit temporary value constructed section-by-section:

| tmp.<17..0>  | = data.<17..0>  | ^state.<63..46> | ^state.<58..41> |
|---|---|---|---|
| tmp.<22..18> | = data.<22..18> | ^tmp.<4..0>     | ^state.<63..59> |
| tmp.<40..23> | = data.<40..23> | ^tmp.<22..5>    | ^tmp.<17..0>    |
| tmp.<58..41> | = data.<58..41> | ^tmp.<40..23>   | ^tmp.<35..18>   |
| tmp.<63..59> | = data.<63..59> | ^tmp.<45..41>   | ^tmp.<40..36>   |
| out          | = tmp           |                 |                 |

In the above description, the meanings of the terms are defined as described below.

val.n (where val stands for any identifier such as data, state, etc. . . . and n stands for an integer, e.g. 45) means bit n of value val, where bit 0 is the least significant and earliest bit and bit 1 is the next more significant (more recent) bit, etc.

val.<m . . . n> means the linear bit sequence (val.m, val.(m−1), . . . val.n) considered as an ordered composite multi-bit entity where val.m is the most significant (and most recent) bit and val.n the least significant (and earliest) bit of the sequence.

bseq1^bseq2 means the linear bit sequence resulting from a parallel bit-wise operation where each bit of the linear bit sequence bseq1 is combined with the corresponding bit of linear bit sequence bseq2 using the logical "exclusive-or" function.

Referring now to FIG. 4, there is shown a logic diagram of one embodiment of the DSLSCR instruction as it may be implemented within an execution unit of a processor. As will be understood by one skilled in the art, the diagram shows only the core functional logic implementing the specific details of the DSLSCR instruction; other non-specific aspects required to implement any processor (such as how the source data bits are directed from their respective registers to the specific logic function for a particular instruction, and how the result value is returned to the required register), are not shown.

In the embodiment in FIG. 4, the gates shown are XOR gates. The first 41 bits of the state input are unused and not shown in FIG. 4. The 23 used bits from the "state" input appear in order at the top left of the diagram; the 64 bits of the "data" input appear in order below them; the 64 bits of the output value "out" are generated in order at the right side of the diagram.

In the wiring format used in FIG. 4, gaps are left in horizontal wires crossing vertical wires to show that there is no connection between them. Any horizontal wire which appears to end without connections is in fact connected to the left or right to the next horizontal wire at the same vertical position. The effective gate depth of the logic for each output bit varies according to position in the output: as shown in the grouping of the logic equations, later output bits depend on the values of earlier output bits which may in turn depend on earlier-still output bits, as well as input bits.

One skilled in the art will realize that this is only one of many possible arrangements of the logic for the present invention. The present invention is not limited to this embodiment of the logic, but may apply to any logic arrangement that produces the same result. For example, another alternative arrangement may use 3-input XOR gates rather than pairs of 2-input XOR gates to produce each output bit.

Thus, the present invention advantageously completes the whole scrambling operation for 8 bytes in a single cycle. As a result, the present invention advantageously increases the efficiency of scrambling data for subsequent modulation and transmission.

Figure 5:
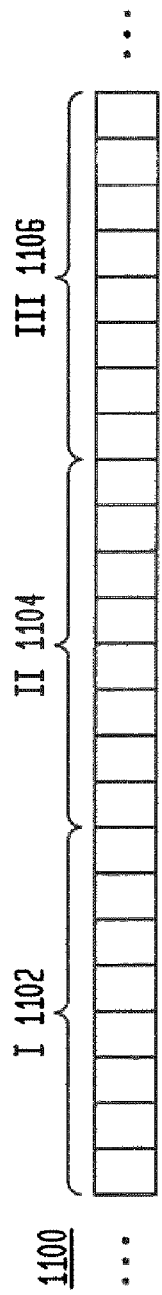
FIG. 5 is a block diagram of a bit stream of data.

In the following, further, additional embodiments of the invention will be described with reference to the FIGS. 5-12. As said above, the present invention relates to Digital Subscriber Line (DSL) communications. The present invention significantly reduces the number of cycles needed to perform the scrambling of data in accordance with relevant DSL standards. The present invention can be used in an implementation of an ADSL Termination Unit—Central (Office) (ATU-C), a VDSL Transceiver Unit—Optical network unit (VTU-O), or in other contexts that require data to be scrambled in the same way (including systems that do not implement DSL). In a single operation, the process of the present invention simultaneously acts upon an eight-byte (64-bit) sequence of data to scramble the eight-byte sequence. FIG. 5 is a block diagram of a bit stream of data 1100. Bit stream 1100 includes three eight-byte sequences: I 1102, II 1104, and III 1106. The present invention is an iterative process in which a scrambled eight-byte sequence from a previous iteration is used to scramble an eight-byte sequence during a current iteration. The previous iteration is consecutive in time with the current iteration. For example, after eight-byte sequence I 1102 is scrambled, it is used to scramble eight-byte sequence II 1104; after eight-byte sequence II 1104 is scrambled, it is used to scramble eight-byte sequence III 1106; etc.

As inputs, the present invention can receive 64 bits of the current eight-byte sequence and 23 most significant bits of the previously scrambled eight-byte sequence. Using the 23 most significant bits of the previously scrambled eight-byte sequence, the present invention scrambles the current eight-byte sequence. As an output, the present invention can produce the current 64-bit scrambled eight-byte sequence. Advantageously, the present invention can produce the current 64-bit scrambled eight-byte sequence in a single clock cycle. This represents a ten-fold reduction in time as compared with conventional methods for producing the current 64-bit scrambled eight-byte sequence.

Figure 6:
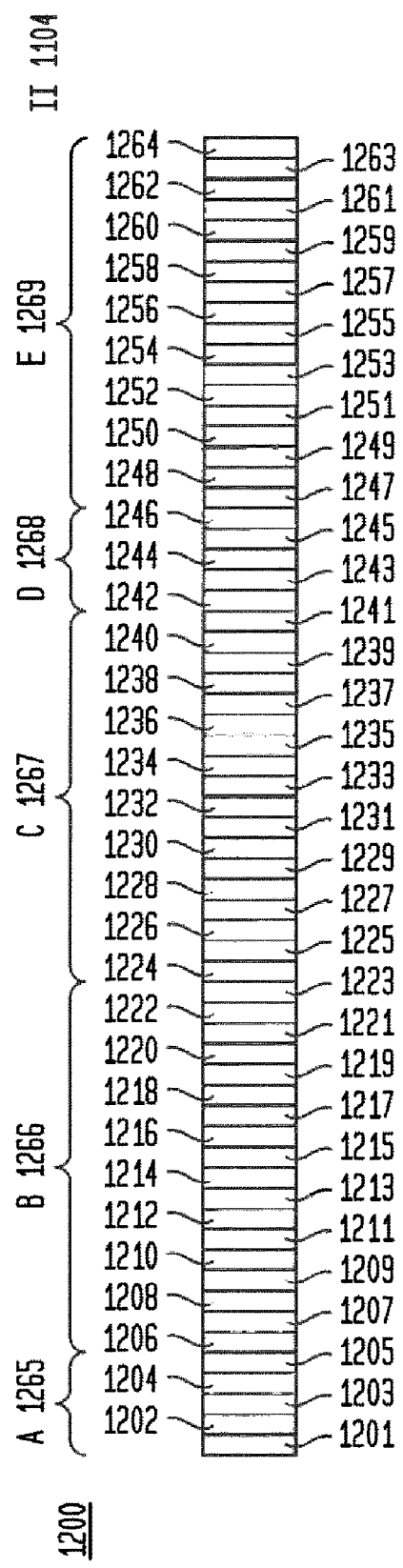
FIG. 6 is a block diagram of a first register for eight-byte sequence II.

FIG. 6 is a block diagram of a first register 1200 for eight-byte sequence II 1104. From most to least significant bit, eight-byte sequence II 1104 comprises a first bit 1201, a second bit 1202, a third bit 1203, a fourth bit 1204, a fifth bit 1205, a sixth bit 1206, a seventh bit 1207, an eighth bit 1208, a ninth bit 1209, a tenth bit 1210, an eleventh bit 1211, a twelfth bit 1212, a thirteenth bit 1213, a fourteenth bit 1214, a fifteenth bit 1215, a sixteenth bit 1216, a seventeenth bit 1217, an eighteenth bit 1218, a nineteenth bit 1219, a twentieth bit 1220, a twenty-first bit 1221, a twenty-second bit 1222, a twenty-third bit 1223, a twenty-fourth bit 1224, a twenty-fifth bit 1225, a twenty-sixth bit 1226, a twenty-seventh bit 1227, a twenty-eighth bit 1228, a twenty-ninth bit 1229, a thirtieth bit 1230, a thirty-first bit 1231, a thirty-second bit 1232, a thirty-third bit 1233, a thirty-fourth bit 1234, a thirty-fifth bit 1235, a thirty-sixth bit 1236, a thirty-seventh bit 1237, a thirty-eighth bit 1238, a thirty-ninth bit 1239, a fortieth bit 1240, a forty-first bit 1241, a forty-second bit 1242, a forty-third bit 1243, a forty-fourth bit 1244, a forty-fifth bit 1245, a forty-sixth bit 1246, a forty-seventh bit 1247, a forty-eighth bit 1248, a forty-ninth bit 1249, a fiftieth bit 1250, a fifty-first bit 1251, a fifty-second bit 1252, a fifty-third bit 1253, a fifty-fourth bit 1254, a fifty-fifth bit 1255, a fifty-sixth bit 1256, a fifty-seventh bit 1257, a fifty-eighth bit 1258, a fifty-ninth bit 1259, a sixtieth bit 1260, a sixty-first bit 1261, a sixty-second bit 1262, a sixty-third bit 1263, and a sixty-fourth bit 1264. First bit 1201 through fifth bit 1205 comprise a first group: A 1265. Sixth bit 1206 through twenty-third bit 1223 comprise a second group: B 1266. Twenty-fourth bit 1224 through forty-first bit 1241 comprise a third group: C 1267. Forty-second bit 1242 through forty-sixth bit 1246 comprise a fourth group: D 1268. Forty-seventh bit 1247 through sixty-fourth bit 1264 comprise a fifth group: E 1269.

Figure 7:
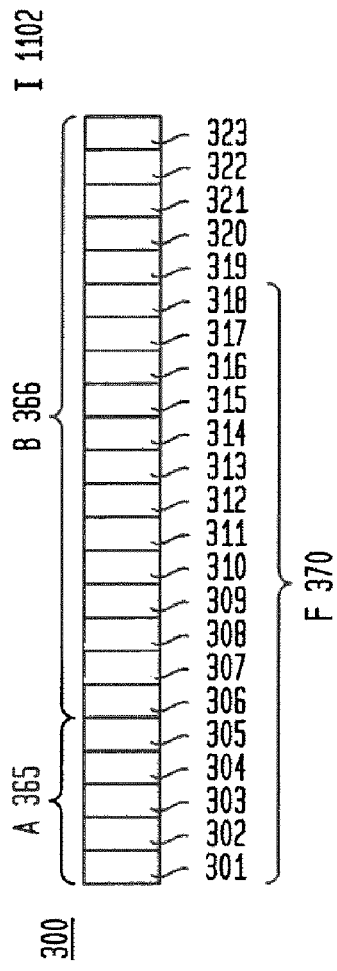
FIG. 7 is a block diagram of a second register for the 23 most significant bits of scrambled eight-byte sequence I.

FIG. 7 is a block diagram of a second register 300 for the 23 most significant bits of scrambled eight-byte sequence I 1102. From most to least significant bit, the 23 most significant bits of scrambled eight-byte sequence I 1102 comprises a first bit 301, a second bit 302, a third bit 303, a fourth bit 304, a fifth bit 305, a sixth bit 306, a seventh bit 307, an eighth bit 308, a ninth bit 309, a tenth bit 310, an eleventh bit 311, a twelfth bit 312, a thirteenth bit 313, a fourteenth bit 314, a fifteenth bit 315, a sixteenth bit 316, a seventeenth bit 317, an eighteenth bit 318, a nineteenth bit 319, a twentieth bit 320, a twenty-first bit 321, a twenty-second bit 322, and a twenty-third bit 323. First bit 301 through fifth bit 305 comprise a first group: A 365. Sixth bit 306 through twenty-third bit 323 comprise a second group: B 366. First bit 301 through eighteenth bit 318 comprise a sixth group: F 370.

Figure 8:
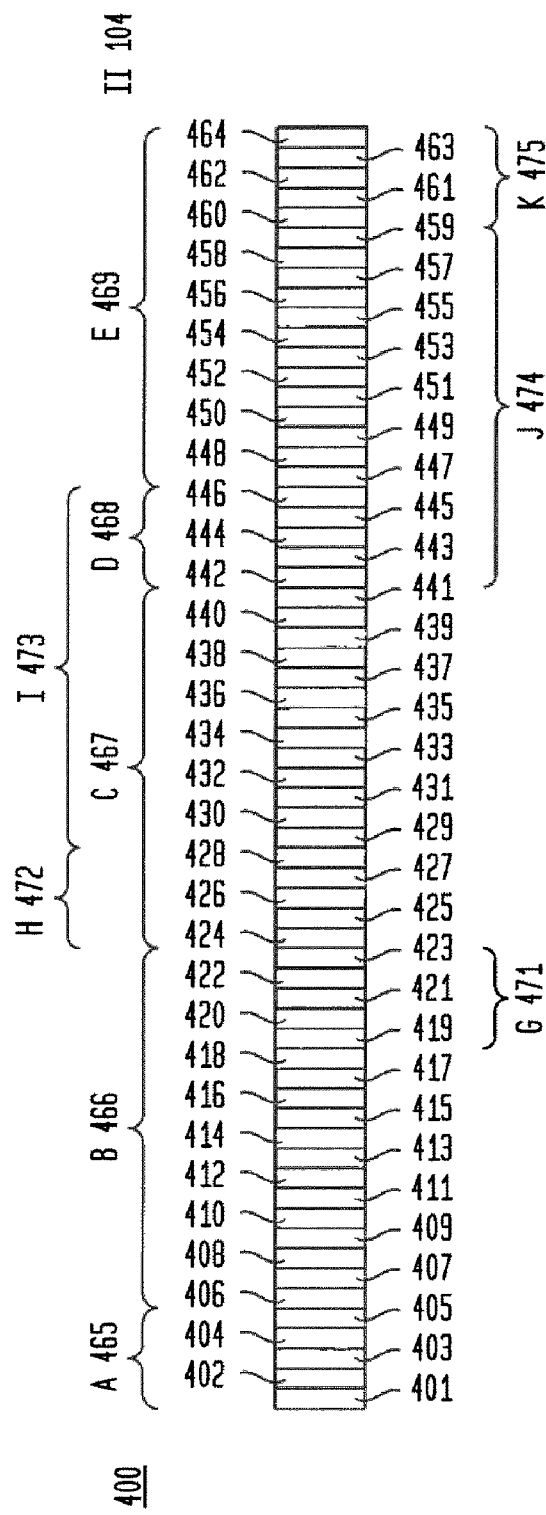
FIG. 8 is a block diagram of a third register for scrambled eight-byte sequence II.

FIG. 8 is a block diagram of a third register 400 for scrambled eight-byte sequence II 1104. From most to least significant bit, scrambled eight-byte sequence I 1104 comprises a first bit 401, a second bit 402, a third bit 403, a fourth bit 404, a fifth bit 405, a sixth bit 406, a seventh bit 407, an eighth bit 408, a ninth bit 409, a tenth bit 410, an eleventh bit 411, a twelfth bit 412, a thirteenth bit 413, a fourteenth bit 414, a fifteenth bit 415, a sixteenth bit 416, a seventeenth bit 417, an eighteenth bit 418, a nineteenth bit 419, a twentieth bit 420, a twenty-first bit 421, a twenty-second bit 422, a twenty-third bit 423, a twenty-fourth bit 424, a twenty-fifth bit 425, a twenty-sixth bit 426, a twenty-seventh bit 427, a twenty-eighth bit 428, a twenty-ninth bit 429, a thirtieth bit 430, a thirty-first bit 431, a thirty-second bit 432, a thirty-third bit 433, a thirty-fourth bit 434, a thirty-fifth bit 435, a thirty-sixth bit 436, a thirty-seventh bit 437, a thirty-eighth bit 438, a thirty-ninth bit 439, a fortieth bit 440, a forty-first bit 441, a forty-second bit 442, a forty-third bit 443, a forty-fourth bit 444, a forty-fifth bit 445, a forty-sixth bit 446, a forty-seventh bit 447, a forty-eighth bit 448, a forty-ninth bit 449, a fiftieth bit 450, a fifty-first bit 451, a fifty-second bit 452, a fifty-third bit 453, a fifty-fourth bit 454, a fifty-fifth bit 455, a fifty-sixth bit 456, a fifty-seventh bit 457, a fifty-eighth bit 458, a fifty-ninth bit 459, a sixtieth bit 460, a sixty-first bit 461, a sixty-second bit 462, a sixty-third bit 463, and a sixty-fourth bit 464. First bit 401 through fifth bit 405 comprise a first group: A 465. Sixth bit 406 through twenty-third bit 423 comprise a second group: B 466. Twenty-fourth bit 424 through forty-first bit 441 comprise a third group: C 467. Forty-second bit 442 through forty-sixth bit 446 comprise a fourth group: D 468. Forty-seventh bit 447 through sixty-fourth bit 464 comprise a fifth group: E 469. Nineteenth bit 419 through twenty-third bit 423 comprise a seventh group: G 471. Twenty-fourth bit 424 through twenty-eighth bit 428 comprise an eighth group: H 472. Twenty-ninth bit 429 through forty-sixth bit 446 comprise a ninth group: I 473. Forty-second bit 442 through fifty-ninth bit 459 comprise a tenth group: J 474. Sixtieth bit 460 through sixty-fourth bit 464 comprise an eleventh group: K 475.

Figure 9:
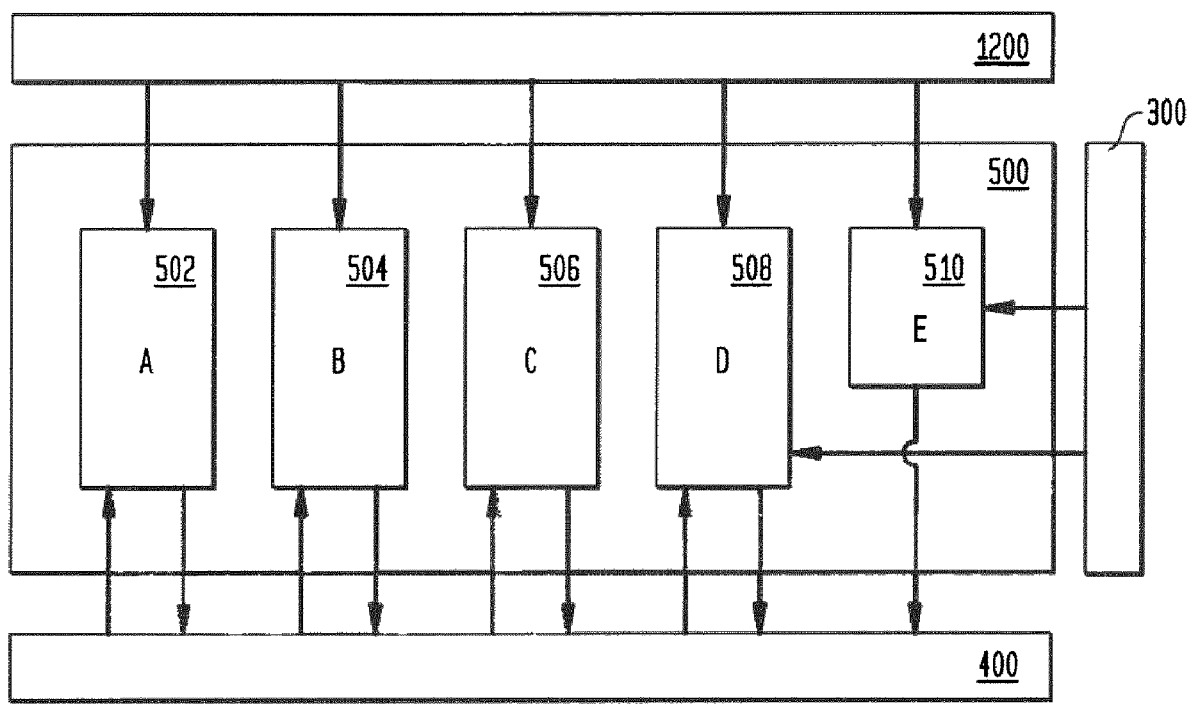
FIG. 9 is a block diagram of a system of the present invention.

FIG. 9 is a block diagram of a system 500 of the present invention. System 500 comprises a first group bit scrambler A 502, a second group bit scrambler B 504, a third group bit scrambler C 506, a fourth group bit scrambler D 508, and a fifth group bit scrambler E 510. System 500 is configured to scramble eight-byte sequence II 1104 in sequential groups of bits from the least to the most significant group: fifth group E 1269, fourth group D 1268, third group C 1267, second group B 1266, and first group A 1265.

Fifth group bit scrambler E 510 can receive fifth group E 1269 from first register 1200, sixth group F 370 from second register 300, and second group B 366 from second register 300. Fifth group bit scrambler E 510 can produce fifth group E 469 at third register 400.

Fourth group bit scrambler D 508 can receive fourth group D 1268 from first register 1200, eleventh group K 475 from third register 400 (produced by fifth group bit scrambler E 510), and first group A 365 from second register 300. Fourth group bit scrambler D 508 can produce fourth group D 468 at third register 400.

Third group bit scrambler C 506 can receive third group C 1267 from first register 1200, tenth group J 474 from third register 400 (produced by fourth group bit scrambler D 508 and fifth group bit scrambler E 510), and fifth group E 469 from third register 400 (produced by fifth group bit scrambler E 510). Third group bit scrambler C 506 can produce third group C 467 at third register 400.

Second group bit scrambler B 504 can receive second group B 1266 from first register 1200, third group C 467 from third register 400 (produced by third group bit scrambler C 506), and ninth group I 473 from third register 400 (produced by second group bit scrambler B 504 and third group bit scrambler C 506). Second group bit scrambler B 504 can produce second group B 466 at third register 400.

First group bit scrambler A 502 can receive first group A 1265 from first register 1200, seventh group G 471 from third register 400 (produced by second group bit scrambler B 504), and eighth group H 472 from third register 400 (produced by third group bit scrambler C 506). First group bit scrambler A 502 can produce first group A 465 at third register 400.

Figure 10:
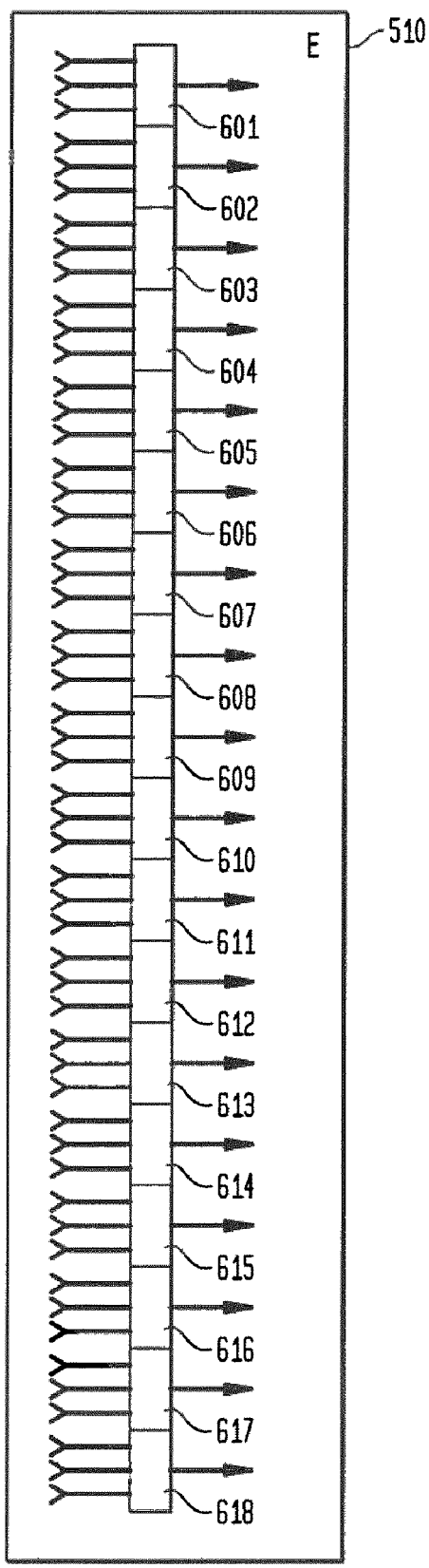
FIG. 10 is a block diagram of an embodiment of fifth group bit scrambler E.

FIG. 10 is a block diagram of an embodiment of fifth group bit scrambler E 510. Third group bit scrambler C 506 and second group bit scrambler B 504 can each be configured in a similar manner. Fifth group bit scrambler E 510 comprises forty-seventh bit scrambler 601, a forty-eighth bit scrambler 602, a forty-ninth bit scrambler 603, a fiftieth bit scrambler 604, a fifty-first bit scrambler 605, a fifty-second bit scrambler 606, a fifty-third bit scrambler 607, a fifty-fourth bit scrambler 608, a fifty-fifth bit scrambler 609, a fifty-sixth bit scrambler 610, a fifty-seventh bit scrambler 611, a fifty-eighth bit scrambler 612, a fifty-ninth bit scrambler 613, a sixtieth bit scrambler 614, a sixty-first bit scrambler 615, a sixty-second bit scrambler 616, a sixty-third bit scrambler 617, and a sixty-fourth bit scrambler 618.

Forty-seventh bit scrambler 601 can receive forty-seventh bit 1247, first bit 301, and sixth bit 306 as inputs, and can produce forty-seventh bit 447 as an output. Forty-eighth bit scrambler 602 can receive forty-eighth bit 1248, second bit 302, and seventh bit 307 as inputs, and can produce forty-eighth bit 448 as an output. Forty-ninth bit scrambler 603 can receive forty-ninth bit 1249, third bit 303, and eighth bit 308 as inputs, and can produce forty-ninth bit 449 as an output. Fiftieth bit scrambler 604 can receive fiftieth bit 1250, fourth bit 304, and ninth bit 309 as inputs, and can produce fiftieth bit 450 as an output. Fifty-first bit scrambler 605 can receive fifty-first bit 1251, fifth bit 305, and tenth bit 310 as inputs, and can produce fifty-first bit 451 as an output. Fifty-second bit scrambler 606 can receive fifty-second bit 1252, sixth bit 306, and eleventh bit 311 as inputs, and can produce fifty-second bit 452 as an output. Fifty-third bit scrambler 607 can receive fifty-third bit 1253, seventh bit 307, and twelfth bit 312 as inputs, and can produce fifty-third bit 453 as an output. Fifty-fourth bit scrambler 608 can receive fifty-fourth bit 1254, eighth bit 308, and thirteenth bit 313 as inputs, and can produce fifty-fourth bit 454 as an output. Fifty-fifth bit scrambler 609 can receive fifty-fifth bit 1255, ninth bit 309, and fourteenth bit 314 as inputs, and can produce fifty-fifth bit 455 as an output. Fifty-sixth bit scrambler 610 can receive fifty-sixth bit 1256, tenth bit 310, and fifteenth bit 315 as inputs, and can produce fifty-sixth bit 456 as an output. Fifty-seventh bit scrambler 611 can receive fifty-seventh bit 1257, eleventh bit 311, and sixteenth bit 316 as inputs, and can produce fifty-seventh bit 457 as an output. Fifty-eighth bit scrambler 612 can receive fifty-eighth bit 1258, twelfth bit 312, and seventeenth bit 317 as inputs, and can produce fifty-eighth bit 458 as an output. Fifty-ninth bit scrambler 613 can receive fifty-ninth bit 1259, thirteenth bit 313, and eighteenth bit 318 as inputs, and can produce fifty-ninth bit 459 as an output. Sixtieth bit scrambler 614 can receive sixtieth bit 1260, fourteenth bit 314, and nineteenth bit 319 as inputs, and can produce sixtieth bit 460 as an output. Sixty-first bit scrambler 615 can receive sixty-first bit 1261, fifteenth bit 315, and twentieth bit 320 as inputs, and can produce sixty-first bit 461 as an output. Sixty-second bit scrambler 616 can receive sixty-second bit 1262, sixteenth bit 316, and twenty-first bit 321 as inputs, and can produce sixty-second bit 462 as an output. Sixty-third bit scrambler 617 can receive sixty-third bit 1263, seventeenth bit 317, and twenty-second bit 322 as inputs, and can produce sixty-third bit 463 as an output. Sixty-fourth bit scrambler 618 can receive sixty-fourth bit 1264, eighteenth bit 318, and twenty-third bit 323 as inputs, and can produce sixty-fourth bit 464 as an output.

Figure 11:
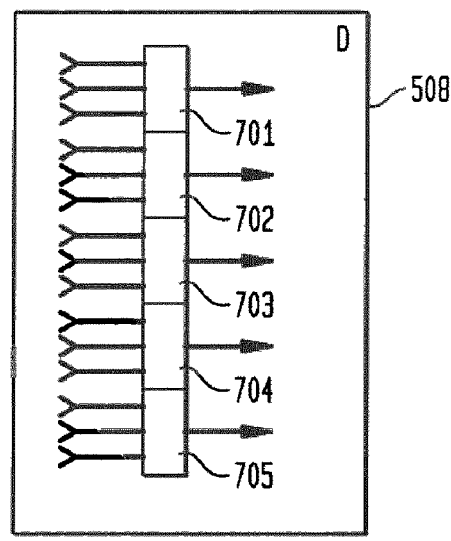
FIG. 11 is a block diagram of an embodiment of fourth group bit scrambler D.

FIG. 11 is a block diagram of an embodiment of fourth group bit scrambler D 508. First group bit scrambler A 502 can be configured in a similar manner. Fourth group bit scrambler D 508 comprises a forty-second bit scrambler 701, a forty-third bit scrambler 702, a forty-fourth bit scrambler 703, a forty-fifth bit scrambler 704, and a forty-sixth bit scrambler 705.

Forty-second bit scrambler 701 can receive forty-second bit 1242, sixtieth bit 460, and first bit 301 as inputs, and can produce forty-second bit 442 as an output. Forty-third bit scrambler 702 can receive forty-third bit 1243, sixty-first bit 461, and second bit 302 as inputs, and can produce forty-third bit 443 as an output. Forty-fourth bit scrambler 703 can receive forty-fourth bit 1244, sixty-second bit 462, and third bit 303 as inputs, and can produce forty-fourth bit 444 as an output. Forty-fifth bit scrambler 704 can receive forty-fifth bit 1245, sixty-third bit 463, and fourth bit 304 as inputs, and can produce forty-fifth bit 445 as an output. Forty-sixth bit scrambler 705 can receive forty-sixth bit 1246, sixty-fourth bit 464, and fifth bit 305 as inputs, and can produce forty-sixth bit 446 as an output.

Figure 12:
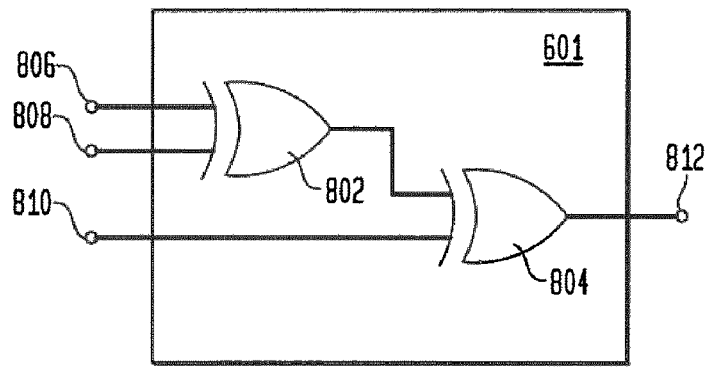
FIG. 12 is a block diagram of an embodiment of forty-seventh bit scrambler.

FIG. 12 is a block diagram of an embodiment of forty-seventh bit scrambler 601. Forty-eighth bit scrambler 602 through sixty-fourth bit scrambler 618 and forty-second bit scrambler 701 through forty-sixth bit scrambler 705 can each be configured in a similar manner. Forty-seventh bit scrambler 601 comprises a first exclusive or gate 802, a second exclusive or gate 804, a first input 806, a second input 808, a third input 810, and an output 812. First input 806 is configured to receive forty-seventh bit 1247. Second input 808 is configured to receive first bit 301. Third input 810 is configured to receive sixth bit 306. Output 812 is configured to produce forty-seventh bit 447.

Figure 13:
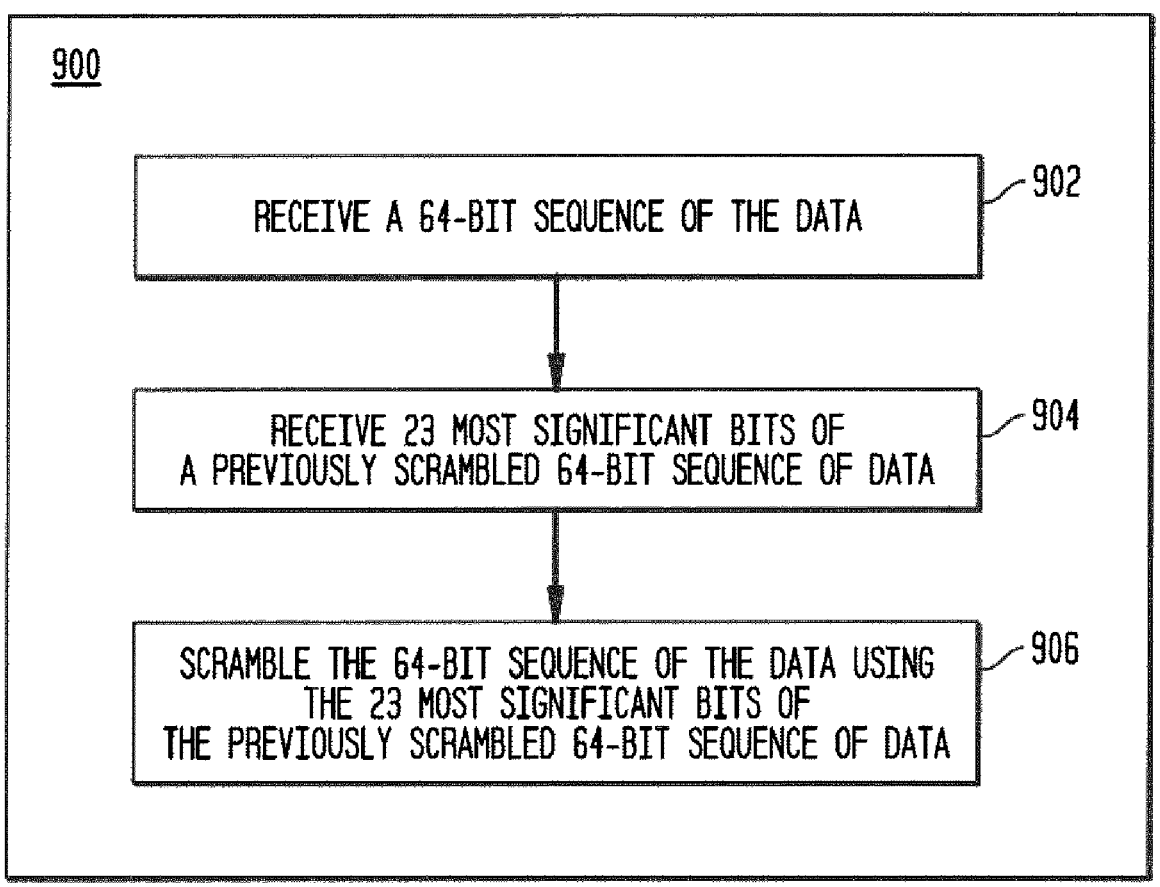
FIG. 13 is a flow diagram of a method for scrambling data in a Digital Subscriber Line system.

FIG. 13 is a flow diagram of a method 900 for scrambling data in a Digital Subscriber Line system. In method 900, at a step 902, a 64-bit sequence of the data is received. At a step 904, a 23 most significant bits of a previously scrambled 64-bit sequence of data is received. At a step 906, the 64-bit sequence of the data is scrambled using the 23 most significant bits of the previously scrambled 64-bit sequence of data.

In an embodiment, a first group of data of the 64-bit sequence of the data is scrambled by a first process, a second group of data of the 64-bit sequence of the data is scrambled by a second process, a third group of data of the 64-bit sequence of the data is scrambled by a third process, a fourth group of data of the 64-bit sequence of the data is scrambled by a fourth process, and a fifth group of data of the 64-bit sequence of the data is scrambled by a fifth process.

In the first process, the first group of data comprises a forty-seventh most significant bit through a sixty-fourth most significant bit of the 64-bit sequence of the data. A sixth group of data of the 23 most significant bits of the previously scrambled 64-bit sequence of data comprises a first most significant bit through an eighteenth most significant bit of the 23 most significant bits of the previously scrambled 64-bit sequence of data. A seventh group of data of the 23 most significant bits of the previously scrambled 64-bit sequence of data comprises a sixth most significant bit through a twenty-third most significant bit of the 23 most significant bits of the previously scrambled 64-bit sequence of data. From the first group of data, the sixth group of data, and the seventh group of data, the first process produces an eighth group of data comprising a forty-seventh most significant bit through a sixty-fourth most significant bit of the scrambled 64-bit sequence of the data.

In the second process, the second group of data comprises a forty-second most significant bit through a forty-sixth most significant bit of the 64-bit sequence of the data. A sixth group of data of the scrambled 64-bit sequence of the data comprises a sixtieth most significant bit through a sixty-fourth most significant bit of the scrambled 64-bit sequence of the data. A seventh group of data of the 23 most significant bits of the previously scrambled 64-bit sequence of data comprises a first most significant bit through a fifth most significant bit of the 23 most significant bits of the previously scrambled 64-bit sequence of data. From the second group of data, the sixth group of data, and the seventh group of data, the second process produces an eighth group of data comprising a forty-second most significant bit through a forty-sixth most significant bit of the scrambled 64-bit sequence of the data.

In the third process, the third group of data comprises a twenty-fourth most significant bit through a forty-first most significant bit of the 64-bit sequence of the data. A sixth group of data of the scrambled 64-bit sequence of the data comprises a forty-second most significant bit through a fifty-ninth most significant bit of the scrambled 64-bit sequence of the data. A seventh group of data of the scrambled 64-bit sequence of the data comprises a forty-seventh most significant bit through a sixty-fourth most significant bit of the scrambled 64-bit sequence of the data. From the third group of data, the sixth group of data, and the seventh group of data, the third process produces an eighth group of data comprising a twenty-fourth most significant bit through a forty-first most significant bit of the scrambled 64-bit sequence of the data.

In the fourth process, the fourth group of data comprises a sixth most significant bit through a twenty-third most significant bit of the 64-bit sequence of the data. A sixth group of data of the scrambled 64-bit sequence of the data comprises a twenty-fourth most significant bit through a forty-first most significant bit of the scrambled 64-bit sequence of the data. A seventh group of data of the scrambled 64-bit sequence of the data comprises a twenty-ninth most significant bit through a forty-sixth most significant bit of the scrambled 64-bit sequence of the data. From the fourth group of data, the sixth group of data, and the seventh group of data, the fourth process produces an eighth group of data comprising a sixth most significant bit through a twenty-third most significant bit of the scrambled 64-bit sequence of the data.

In the fifth process, the fifth group of data comprises a first most significant bit through a fifth most significant bit of the 64-bit sequence of the data. A sixth group of data of the scrambled 64-bit sequence of the data comprises a nineteenth most significant bit through a twenty-third most significant bit of the scrambled 64-bit sequence of the data. A seventh group of data of the scrambled 64-bit sequence of the data comprises a twenty-fourth most significant bit through a twenty-eighth most significant bit of the scrambled 64-bit sequence of the data. From the fifth group of data, the sixth group of data, and the seventh group of data, the fifth process produces an eighth group of data comprising a first most significant bit through a fifth most significant bit of the scrambled 64-bit sequence of the data.

Figure 14:
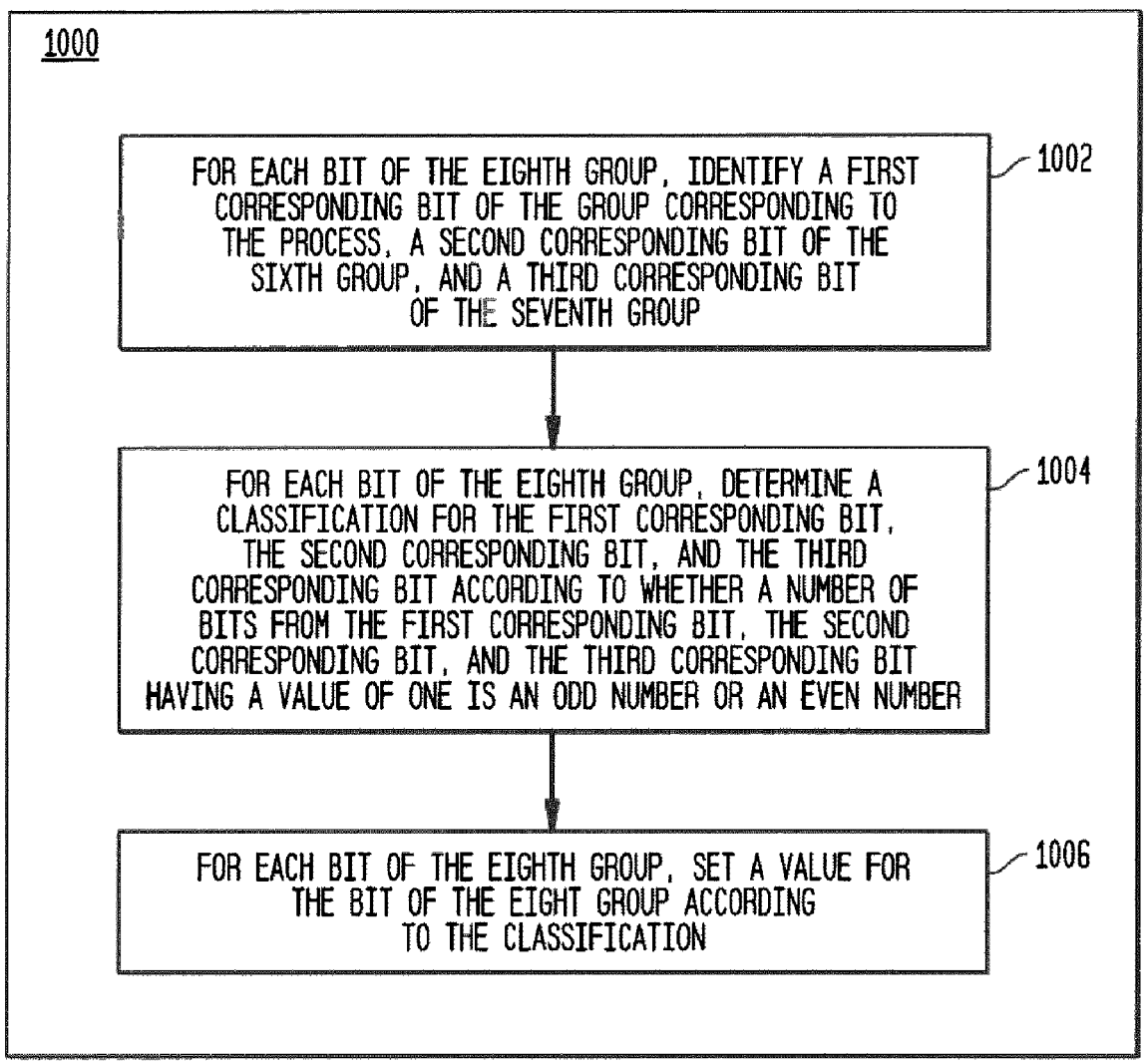
FIG. 14 is a flow diagram of a method for processing groups of data to produce a corresponding scrambled group of data for a sequence of bits within the 64-bit sequence.

FIG. 14 is a flow diagram of a method 1000 for processing groups of data to produce a corresponding scrambled group of data for a sequence of bits within the 64-bit sequence. In method 1000, for a process as identified above, at a step 1002, for each bit of the eighth group, a first corresponding bit of the group corresponding to the process is identified, a second corresponding bit of the sixth group is identified, and a third corresponding bit of the seventh group is identified. At a step 1004, for each bit of the eighth group, a classification for the identified first corresponding bit, the identified second corresponding bit, and the identified third corresponding bit is determined according to whether a number of bits from the identified first corresponding bit, the identified second corresponding bit, and the identified third corresponding bit having a first value of one is one of an odd number and an even number. At a step 1006, for each bit of the eighth group, a second value for the bit of the eighth group is set according to the determined classification.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for executing a single instruction scrambler on a processor, comprising:
  (a) providing the processor with a single instruction that includes an opcode indicating a scrambling instruction;
  (b) providing the processor with an input data value using a first field of the instruction;

(c) providing the processor with an input state value using a second field of the instruction, wherein a plurality of bits of a scrambled output value from one application of the scrambling instruction is the input state value for a next application of the scrambling instruction;

(d) providing the processor with a reference to a destination register of the processor using a third field of the instruction;

(e) scrambling the input data value using the input state value to create a scrambled output value; and (f) storing the scrambled output value in the destination register.

2. The method of claim 1, wherein step (e) comprises:
(e)(i) scrambling the input data value in accordance with Digital Subscriber Line (DSL) standards.

3. The method of claim 1, wherein step (b) comprises:
(b)(i) providing the processor with the input data value having 64 bits of original source data.

4. The method of claim 1, wherein step (e) comprises:
(e)(i) scrambling the input data value using the input state value to create the scrambled output value having a 64-bit output.

5. The method of claim 4, wherein step (c) comprises:
(c)(i) providing the processor with the input state value having a last 23 bits of a 64-bit output from one application of the scrambling instruction.

6. The method of claim 1, wherein the method is incorporated into in a central-office modem end of a Digital Subscriber Line (DSL) link.

7. The method of claim 1, wherein the input state is based on at least a portion of a previously scrambled sequence of data.

8. A method of operating a processor, comprising:
(a) providing the processor with original source data using a first field of a single scrambling instruction;
(b) providing the processor with an input state data using a second field of the scrambling instruction, wherein a plurality of bits of a scrambled output value from one application of the scrambling instruction is the input state value for a next application of the scrambling instruction; and
(c) in response to execution of the scrambling instruction by the processor, scrambling one or more bytes of original source data using the input state data.

9. The method of claim 8, step (b) comprising:
(1) receiving as an input 64 bits of original source data and 23 bits of previous scrambling state data, and wherein step (c) comprises:
(c)(i) scrambling the original source data to produce as an output 64 bits of scrambled data.

10. The method of claim 9, wherein step (e) further comprises:
(c)(ii) scrambling the one or more bytes of data using the previous scrambling state data, the previous scrambling state data including a last 23 bits of the 64-bit output from one application of the instruction.

11. The method of claim 8, wherein step (c) comprises:
(c)(i) scrambling one or more bytes of data according to at least one of an Asymmetric Digital Subscriber Line (ADSL) standard and a Very High Bit-Rate Digital Subscriber Line (VDSL) standard.

12. The method of claim 8, wherein step (c) comprises:
(c) (i) scrambling one or more bytes of data using a 64-bit long instruction word machine comprising two identical execution units.

13. The method of claim 8, wherein the processor is incorporated into a chip-set implementing a central-office modem end of a Digital Subscriber Line (DSL) link.

14. The method of claim 8, wherein step (c) comprises:
(c) (i) scrambling 8 bytes of data in a single cycle.

15. A processor, comprising:
a plurality of registers; and
at least one execution unit configured to scramble one or more bytes of source data using input state data in response to a single instruction executable by the processor, wherein the single instruction includes an opcode indicating a single instruction for scrambling, a first field that directs the processor to the source data and a second field that directs the processor to the input state data, wherein a plurality of bits of a scrambled output value from one application of the single instruction is the input state, value for a next application of the single instruction.

16. The processor of claim 15, wherein the instruction receives as an input 64 bits of the original source data and 23 bits of previous scrambling input state data, and produces as an output 64 bits of the scrambled data.

17. The processor of claim 16, wherein a last 23 bits of the 64-bit output from one application of the instruction is the previous scrambling state input data for a next application of the instruction.

18. The processor of claim 15, wherein the data is Digital Subscriber Line (DSL) data and the DSL data is scrambled according to at least one of an Asymmetric Digital Subscriber Line (ADSL) standard and a Very High Bit-Rate Digital Subscriber Line (VDSL) standard.

19. The processor of claim 15, wherein the processor is a 64-bit long instruction word machine including at least two identical execution units.

20. The processor of claim 15, wherein the processor is incorporated into in a chip-set implementing a central-office modem end of a Digital Subscriber Line (DSL) link.

21. The processor of claim 15, wherein the at least one execution unit scrambles 8 bytes of data in a single cycle.

22. An apparatus comprising:
a processor;
a plurality of registers accessible to the processor; and
means for scrambling one or more bytes of source data using input state data in response to a single instruction executable by the processor, wherein the single instruction includes an opcode indicating a single instruction for scrambling, a first field that directs the processor to the source data and a second field that directs the processor to the input state data, wherein a plurality of bits of a scrambled output value from one application of the scrambling instruction is the input state value for a next application of the scrambling instruction.

23. The apparatus of claim 22, wherein the instruction receives as an input 64 bits of original source data and 23 bits of previous scrambling state data, and produces as an output 64 bits of scrambled data.

24. The apparatus of claim 23, wherein a last 23 bits of the 64-bit output from one application of the instruction is the previous scrambling state input data for a next application of the instruction.

25. The apparatus of claim 22, wherein the data is Digital Subscriber Line (DSL) data and the DSL data is scrambled according to at least one of an Asymmetric Digital Subscriber Line (ADSL) standard and a Very High Bit-Rate Digital Subscriber Line (VDSL) standard.

26. The apparatus of claim 22, wherein the processor is a 64-bit long instruction word machine including at least two identical execution units.

27. The apparatus of claim 22, wherein the processor is incorporated into a chip-set implementing a central-office modem end of a Digital Subscriber Line (DSL) link.

28. The apparatus of claim 22, wherein the means for scrambling scrambles 8 bytes of data in a single cycle.

29. In a Digital Subscriber Line system, a method for scrambling data using a single instruction, comprising:
   (1) receiving a 64-bit sequence of the data, the data referenced by a first field of the single instruction;
   (2) receiving input state data including a 23 most significant bits of a previously scrambled 64-bit sequence of data, the input state data referenced by a second field of the single instruction; and
   (3) scrambling said received 64-bit sequence of the data using said received 23 most significant bits of the previously scrambled 64-bit sequence of data.

30. The method of claim 29, wherein step (3) comprises:
   (a) scrambling a first group of data of said received 64-bit sequence of the data by a first process;
   (b) scrambling a second group of data of said received 64-bit sequence of the data by a second process;
   (c) scrambling a third group of data of said received 64-bit sequence of the data by a third process;
   (d) scrambling a fourth group of data of said received 64-bit sequence of the data by a fourth process; and
   (e) scrambling a fifth group of data of said received 64-bit sequence of the data by a fifth process.

31. The method of claim 30, wherein the first group of data includes a forty-seventh most significant bit through a sixty-fourth most significant bit of said received 64-bit sequence of the data, a sixth group of data of said received 23 most significant bits of the previously scrambled 64-bit sequence of data includes a first most significant bit through an eighteenth most significant bit of said received 23 most significant bits of the previously scrambled 64-bit sequence of data, a seventh group of data of said received 23 most significant bits of the previously scrambled 64-bit sequence of data includes a sixth most significant bit through a twenty-third most significant bit of said received 23 most significant bits of the previously scrambled 64-bit sequence of data, and the first process produces an eighth group of data including a forty-seventh most significant bit through a sixty-fourth most significant bit of said scrambled 64-bit sequence of the data from the first group of data, the sixth group of data, and the seventh group of data.

32. The method of claim 31, wherein the first process comprises:
   (i) identifying a first corresponding bit of the first group, a second corresponding bit of the sixth group, and a third corresponding bit of the seventh group for each bit of the eighth group;
   (ii) determining a classification for said identified first corresponding bit, said identified second corresponding bit, and said identified third corresponding bit for each bit of the eighth group according to whether a number of bits from said identified first corresponding bit, said identified second corresponding bit, and said identified third corresponding bit having a value of one is one of an odd number and an even number; and
   (iii) setting each bit of the eighth group according to said determined classification.

33. The method of claim 30, wherein the second group of data includes a forty-second most significant bit through a forty-sixth most significant bit of said received 64-bit sequence of the data, a sixth group of data of said scrambled 64-bit sequence of the data includes a sixtieth most significant bit through a sixty-fourth most significant bit of said scrambled 64-bit sequence of the data, a seventh group of data of said received 23 most significant bits of the previously scrambled 64-bit sequence of data includes a first most significant bit through a fifth most significant bit of said received 23 most significant bits of the previously scrambled 64-bit sequence of data, and the second process produces an eighth group of data including a forty-second most significant bit through a forty-sixth most significant bit of said scrambled 64-bit sequence of the data from the second group of data, the sixth group of data, and the seventh group of data.

34. The method of claim 33, wherein the second process comprises:
   (i) identifying a first corresponding bit of the second group, a second corresponding bit of the sixth group, and a third corresponding bit of the seventh group for each bit of the eighth group;
   (ii) determining a classification for said identified first corresponding bit, said identified second corresponding bit, and said identified third corresponding bit for each bit of the eighth group according to whether a number of bits from said identified first corresponding bit, said identified second corresponding bit, and said identified third corresponding bit having a value of one is one of an odd number and an even number; and
   (iii) setting each bit of the eighth group according to said determined classification.

35. The method of claim 30, wherein the third group of data includes a twenty-fourth most significant bit through a forty-first most significant bit of said received 64-bit sequence of the data, a sixth group of data of said scrambled 64-bit sequence of the data includes a forty-second most significant bit through a fifty-ninth most significant bit of said scrambled 64-bit sequence of the data, a seventh group of data of said scrambled 64-bit sequence of the data includes a forty-seventh most significant bit through a sixty-fourth most significant bit of said scrambled 64-bit sequence of the data, and the third process produces an eighth group of data comprising a twenty-fourth most significant bit through a forty-first most significant bit of said scrambled 64-bit sequence of the data from the third group of data, the sixth group of data, and the seventh group of data.

36. The method of claim 35, wherein the third process comprises:
   (i) identifying a first corresponding bit of the third group, a second corresponding bit of the sixth group, and a third corresponding bit of the seventh group for each bit of the eighth group;
   (ii) determining a classification for said identified first corresponding bit, said identified second corresponding bit, and said identified third corresponding bit for each bit of the eighth group according to whether a number of bits from said identified first corresponding bit, said identified second corresponding bit, and said identified third corresponding bit having a value of one is one of an odd number and an even number; and
   (iii) setting each bit of the eighth group according to said determined classification.

37. The method of claim 30, wherein the fourth group of data includes a sixth most significant bit through a twenty-third most significant bit of said received 64-bit sequence of the data, a sixth group of data of said scrambled 64-bit sequence of the data includes a twenty-fourth most significant bit through a forty-first most significant bit of said scrambled 64-bit sequence of the data, a seventh group of data of said scrambled 64-bit sequence of the data includes a twenty-ninth most significant bit through a forty-sixth most significant bit of said scrambled 64-bit sequence of the data, and the fourth process produces an eighth group of data including a sixth most significant bit through a twenty-third most significant bit of said scrambled 64-bit sequence of the data from the fourth group of data, the sixth group of data, and the seventh group of data.

38. The method of claim 37, wherein the fourth process comprises:
   (i) identifying a first corresponding bit of the fourth group, a second corresponding bit of the sixth group, and a third corresponding bit of the seventh group for each bit of the eighth group;
   (ii) determining a classification for said identified first corresponding bit, said identified second corresponding bit, and said identified third corresponding bit for each bit of the eighth group according to whether a number of bits from said identified first corresponding bit, said identified second corresponding bit, and said identified third corresponding bit having a value of one is one of an odd number and an even number; and
   (iii) setting each bit of the eighth group according to said determined classification.

39. The method of claim 30, wherein the fifth group of data includes a first most significant bit through a fifth most significant bit of said received 64-bit sequence of the data, a sixth group of data of said scrambled 64-bit sequence of the data includes a nineteenth most significant bit through a twenty-third most significant bit of said scrambled 64-bit sequence of the data, a seventh group of data of said scrambled 64-bit sequence of the data includes a twenty-fourth most significant bit through a twenty-eighth most significant bit of said scrambled 64-bit sequence of the data, and the fifth process produces an eighth group of data including a first most significant bit through a fifth most significant bit of said scrambled 64-bit sequence of the data from the fifth group of data, the sixth group of data, and the seventh group of data.

40. The method of claim 39, wherein the fifth process comprises:
   (i) identifying a first corresponding bit of the fifth group, a second corresponding bit of the sixth group, and a third corresponding bit of the seventh group for each bit of the eighth group;
   (ii) determining a classification for said identified first corresponding bit, said identified second corresponding bit, and said identified third corresponding bit for each bit of the eighth group according to whether a number of bits from said identified first corresponding bit, said identified second corresponding bit, and said identified third corresponding bit having a value of one is one of an odd number and an even number; and
   (iii) setting each bit of the eighth group according to said determined classification.

41. A non-transitory computer readable storage medium having computer program code recorded thereon, that when executed by a processor, causes the processor to scramble data, by:
   receiving a single instruction that includes an opcode indicating a scrambling instruction, an input data value using a first field of the instruction, an input state value using a second field of the instruction and a reference to a destination register of the processor using a third field of the instruction;
   scrambling the input data value using the input state value to create a scrambled output value; and
   storing the scrambled output value in the destination register;
   wherein a plurality of bits of a scrambled output value from one application of the scrambling instruction is the input state value for a next application of the scrambling instruction.

* * * * *